US010884571B2

(12) United States Patent
Otero

(10) Patent No.: US 10,884,571 B2
(45) Date of Patent: Jan. 5, 2021

(54) DEPENDENCY-BASED PRESENCE FOR CO-AUTHORED DOCUMENTS

(71) Applicant: Microsoft Technology Licensing, LLC, Redmond, WA (US)

(72) Inventor: Carlos Otero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 43 days.

(21) Appl. No.: 15/868,831

(22) Filed: Jan. 11, 2018

(65) Prior Publication Data

US 2019/0212878 A1    Jul. 11, 2019

(51) Int. Cl.
| | |
|---|---|
| *G06F 3/0481* | (2013.01) |
| *G06F 3/0484* | (2013.01) |
| *G06F 16/27* | (2019.01) |
| *G06F 16/25* | (2019.01) |
| *G06Q 10/10* | (2012.01) |
| *G06F 40/18* | (2020.01) |
| *G06F 16/28* | (2019.01) |
| *G06F 40/197* | (2020.01) |

(52) U.S. Cl.
CPC ........ *G06F 3/0481* (2013.01); *G06F 3/04842* (2013.01); *G06F 16/252* (2019.01); *G06F 16/27* (2019.01); *G06F 16/289* (2019.01); *G06F 40/18* (2020.01); *G06F 40/197* (2020.01); *G06Q 10/101* (2013.01)

(58) Field of Classification Search
CPC .... G06F 3/0481; G06F 16/289; G06F 16/252; G06F 16/27; G06F 3/04842; G06F 17/246; G06F 40/18; G06F 40/197; G06Q 10/101

See application file for complete search history.

(56) References Cited

U.S. PATENT DOCUMENTS

| | | | | |
|---|---|---|---|---|
| 5,303,146 | A | * | 4/1994 | Ammirato ............. G06F 3/0489 715/204 |
| 6,049,334 | A | | 4/2000 | Bates et al. |
| 6,057,837 | A | * | 5/2000 | Hatakeda .............. G06F 17/246 715/708 |

(Continued)

OTHER PUBLICATIONS

"Numbers for Mac: Collaborate on a shared Numbers spreadsheet", Retrieved from<<https://support.apple.com/kb/PH23734?locale=en_US&viewlocale=en_US>>, Sep. 27, 2017, 2 Pages.

(Continued)

*Primary Examiner* — Daniel W Parcher

(57) ABSTRACT

In non-limiting examples of the present disclosure, systems, methods and devices for assisting with providing a dependency-based presence indication are presented. An indication that a first application instance of a co-authored file is active may be received. An indication that a second application instance associated with the co-authored file is concurrently active with the first application instance may be received. A data-modification indication that data affecting at least one object displayed on a user interface of a computing device executing the first application is being accessed by a second computing device executing the second application may be received. The at least one object may be caused to be highlighted on the user interface of the computing device executing the first application instance based on the received data-modification indication.

17 Claims, 9 Drawing Sheets

(56) References Cited

U.S. PATENT DOCUMENTS

| | | | | |
|---|---|---|---|---|
| 9,471,897 | B1* | 10/2016 | Dunne | G06F 3/0481 |
| 9,635,105 | B2 | 4/2017 | Simon et al. | |
| 9,684,646 | B2 | 6/2017 | Coblenz et al. | |
| 2002/0023105 | A1* | 2/2002 | Wisniewski | G06F 17/246 715/212 |
| 2006/0069696 | A1* | 3/2006 | Becker | G06F 17/246 |
| 2007/0233811 | A1 | 10/2007 | Rochelle et al. | |
| 2009/0112937 | A1 | 4/2009 | Campbell et al. | |
| 2009/0235152 | A1* | 9/2009 | Rampson | G06F 17/246 715/207 |
| 2013/0174032 | A1 | 7/2013 | Tse et al. | |
| 2013/0191451 | A1* | 7/2013 | Tse | G06Q 10/101 709/204 |
| 2014/0372852 | A1 | 12/2014 | Rothschiller et al. | |
| 2015/0106750 | A1 | 4/2015 | Konami et al. | |
| 2015/0350273 | A1* | 12/2015 | French | H04L 12/1822 709/205 |
| 2017/0017779 | A1* | 1/2017 | Huang | G06F 21/16 |
| 2017/0168878 | A1 | 6/2017 | Chandra et al. | |

OTHER PUBLICATIONS

"Zoho Sheets", Retrieved from<<https://www.zoho.com/docs/whats-new-in-zoho-sheet.html>>, Sep. 10, 2015, 39 Pages.

Anderson, Ryan, "Work in real-time with presence for documents and spreadsheets", Retrieved from<<https://quip.com/blog/presence-for-documents-spreadsheets>>, Aug. 16, 2016, 8 Pages.

Liccardi, et al., "CAWS: Visualizing awareness to improve the effectiveness of co-authoring activities", In Proceedings of IEEE Distributed Systems Online, vol. 9, Issue 12, Jan. 1, 2008, 6 Pages.

Reynolds, Michael, "Your Guide to Collaborative Document Editing With Google Docs", Retrieved from<<https://blog.spinweb.net/how-to-collaborate-with-google-docs>>, Oct. 18, 2016, 21 Pages.

Anson, Alexander, "Google Docs Sharing and Collaboration Tutorial", Retrieved from: https://www.youtube.comjwatch?v=i0P-i9gD--c, Feb. 28, 2011, 8 Pages.

Goranka, "How to Work with Pivot Tables in Google Sheets", Retrieved from: https://www.investintech.com/resources/blog/archives/7717-pivot-tables-in-google-sheets.html, Nov. 6, 2017, 7 Pages.

"International Search Report and Written Opinion Issued in PCT Application No. PCT/US18/065576", dated Apr. 4, 2019, 17 Pages.

* cited by examiner

DEPENDENCY-BASED PRESENCE FOR CO-AUTHORED DOCUMENTS

BACKGROUND

Co-authoring of documents has become commonplace with the rise of cloud computing. This has been increasingly the case for enterprise-based users, such as related users of companies and other organizations, that rely on other users' data in compiling portions of documents that incorporate values from many different facets of such enterprises. The use of cloud computing in co-authoring documents provides advantages over traditional document editing, including traditional computer-based document editing (i.e., editing different document versions and emailing those document versions amongst co-authoring users), at least in that it allows co-authors to view the edits that are being made by other co-authors in near real-time, while eliminating the need for users to send individual edit instances to one another, which may reflect outdated information when two or more users are editing a document at the same time.

It is with respect to this general technical environment that aspects of the present technology disclosed herein have been contemplated. Furthermore, although a general environment has been discussed, it should be understood that the examples described herein should not be limited to the general environment identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter. Additional aspects, features, and/or advantages of examples will be set forth in part in the description which follows and, in part, will be apparent from the description or may be learned by practice of the disclosure.

Non-limiting examples of the present disclosure describe systems, methods and devices for providing dependency-based presence indications for co-authored application instances. In some examples, a first application instance of a co-authored file (e.g., a spreadsheet file, a word processing file, a presentation file, etc.) may be opened by a first user. A second application instance related to the co-authored file may be opened by a second user. Thus, the first application instance and the second application instance may be concurrently active on first and second computing devices of first and second users, respectively. In some examples, the second application instance may comprise execution of the same co-authored file as opened by the first user, or the second application instance may comprise execution of a file from which at least one object of the first co-authored file depends. As used herein, the term "object" may comprise a variable, a data structure, a table, a column, an association between data and a database entity, a function, a method, an instance of a class, and/or a combination of one or more of the same.

According to some aspects, when first and second application instances are concurrently active, and a selection of an object is made in the second application instance that affects an object in the first application instance (or in some examples, a determination is made that a user of the second application instance is present in a container comprising an object that affects an object in the first application instance), an indication that the selected object (or the user's determined presence in a container comprising the selected object) may impact an object of the first application instance may be caused to be displayed on a graphical user interface associated with the first user and the first application instance. For example, when a first application instance comprises the execution and display of at least a portion of a co-authored spreadsheet application, an object displayed in the first application instance may be dependent on one or more values and/or functions included in the same application file or a separate application file. In such examples, the dependent object of the first application instance may be displayed on the user interface of a first computing device, and a second application instance of a co-authored file, from which the object in the first instance is dependent on, may be interacted with via a second computing device. When an indication is received that the object may be affected by the interaction (e.g., a selection of a cell that includes a value that affects the object, a cursor hover over a value that affects the object, etc.) implemented in the second application instance, an indication may be displayed on the user interface corresponding to the first application instance that the object may be affected by the interaction. In examples, the indication may displayed on the user interface in proximity to the object.

BRIEF DESCRIPTION OF THE DRAWINGS

Non-limiting and non-exhaustive examples are described with reference to the following figures.

DETAILED DESCRIPTION

Figure 1:
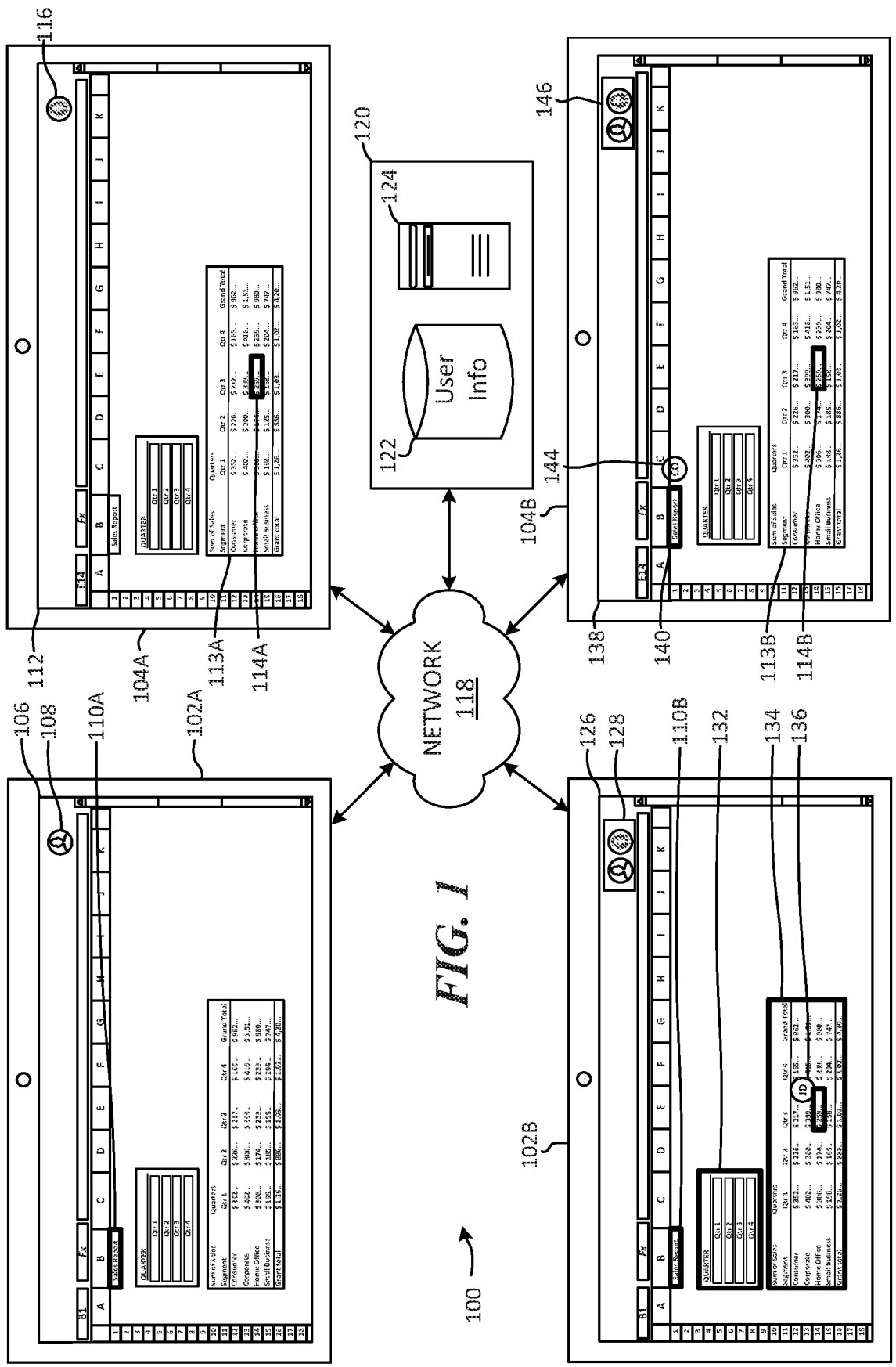
FIG. 1 is a schematic diagram illustrating an example distributed computing environment for providing dependency-based presence indications for co-authored documents.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The various embodiments and examples described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the claims.

Generally, the present disclosure is directed to systems, methods and devices for providing dependency-based presence indications for co-authored documents. The examples described herein support scenarios associated with cloud-based documents that include co-authoring functionality where one or more dependent objects of a displayed first active instance of a co-authored document on a first computing device may be affected by interaction with underlying data, or interaction with a container comprising underlying data, affecting the one or more dependent objects by a second active instance of the co-authored document on a second computing device. In some examples, the functionality may support scenarios where one or more dependent objects of a displayed first active instance of a co-authored document on a first computing device may be affected by interaction with underlying data affecting the one or more dependent objects by instances of other cloud-based documents active on one or more second computing devices, that are not the first active instance of the co-authored document, but nonetheless affect the one or more dependent objects.

In some examples, in addition or alternative to providing dependency-based presence indications for co-authored documents based on object-based dependencies, the system, methods and devices described herein may provide dependency-based presence indications for co-authored documents based on container-based dependencies. For example, if a first application instance comprising a first object (e.g., a pivot table, a function in a spreadsheet cell) comprised in a first container (e.g., a sheet of a spreadsheet application, a slide of a presentation application, etc.) that is dependent on a second object (e.g., underlying data for a pivot table, underling data for a function in a spreadsheet application) comprised in a second container (e.g., a sheet of a spreadsheet application, a slide of a presentation application, etc.) of a second application instance, an indication that the dependent object in the first application instance may be affected based on an interaction that occurred in the second container containing the second object, may be caused to be displayed in the first application instance based on any interaction in the second application instance occurring in the second container. Thus, in some examples, a distinct interaction with the second object in the second container is not a necessary pre-requisite to providing an indication that a user's interaction in the second application instance may affect an object in the first application instance.

In some examples, in a first application instance, one or more indications that a dependent object has been affected by interaction with one or more objects and/or application elements, upon which the dependent object depends, interacted with via a second application instance may be persisted in the first application instance when the second application instance is no longer active. For example, if a pivot table of a first application instance has been affected by interaction with an underlying dataset in a second application instance, an indication may be caused to be displayed in association with the affected pivot table of the first application instance despite the second application instance no longer being active. According to examples, the indication may comprise one or more of: highlighting of an affected dependent object and/or application element, highlighting an area in proximity to an affected dependent object and/or application element, display of a translucent colored filter over an area corresponding to an affected dependent object and/or application element, and/or identifying information of a user that caused the dependent object and/or application element to be affected via interaction in the second application instance, among others.

The underlying data of dependent objects may be associated with those dependent objects based on relationships including: pivot table data source relationships, slicer data relationships, relational database relationships, such as PowerPivot relationships, data validation relationships, function relationships, etc. Aspects of the disclosure provide mechanisms for optimizing co-authoring cloud-based systems associated with social user experiences within documents that have interrelated and/or chained dependencies (e.g., dependencies amongst co-authored spreadsheet documents, word processing documents, presentation documents, etc.). For example, the systems, methods, and devices described herein support the providing of displayed indications that one or more dependent objects of a first application instance comprised in a first application type (e.g., a spreadsheet application, a word processing application, a presentation application, etc.) have been affected by, or could potentially be affected by, interaction with, in one or more second application instances, one or more objects upon which the one or more dependent objects depend. The one or more objects upon which the one or more dependent objects depend may be comprised in a same co-authored application as the dependent object in the first application instance and/or one or more other applications, which share relationships with the co-authored application of the first application instance. Additionally, the one or more interacted with objects that may affect the dependent object in the first application instance may be comprised in an application of the same application type (e.g., a spreadsheet application, a word processing document, etc.) as the application of the first application instance, or the one or more interacted with objects that may affect the dependent object in the first application instance may be comprised in one or more applications of a different application type than the application of the first application instance. For example, a first interacted with object that affects a dependent object in a first application instance may be comprised in a first application of a first application type having a relationship to the first application instance, and one or more additional interacted with objects that affect the dependent object in the first application instance may be comprised in one or more additional applications of one or more application types having relationships to the first application instance, which may be the same as, or different from, the application type corresponding to the application type of the first application instance.

In some examples, if a first user is interacting with a first sheet of a cloud-based document that includes a currently displayed dependent object or objects (e.g., the first user is interacting with a first sheet that includes a pivot table that depends on underlying data from a second sheet of the cloud-based document, or a cloud-based document associated with the cloud-based document), and a second user selects a cell in a data sheet (or other data source) from which an interacted with object or objects of the first sheet of the cloud-based document depend, an indication that the second user has selected a cell that includes dependency data may be caused to be displayed in associated with the potentially affected object or objects on the user interface of the first user's device. Likewise, an indication that the second user's selection (or a change to data associated with that selection) of underlying data that may affect an object or objects displayed on an active instance of the first user's instance of a cloud-based document may be caused to be displayed on the second user's display in association with the data selected by the second user in the second user's displayed application instance.

Various indication types (e.g., highlighting of an object and/or container, a color of a highlight for an object and/or container, shading of an object and/or container, a color shade of a shaded object and/or container, the overlay of information corresponding to an interacting user's identity, etc.), may be implemented by the systems, methods and devices described herein. For example, a type of displayed indication that a first object in a first application instance may be affected by an interaction associated with a second object in a second application instance, may be dependent on a state type of the interaction. Interaction state types may include, for example, an editing of data state type, a refreshing of data state type, a formatting of data state type, a cell selection state type, a location-based presence state type (e.g., a cursor's location in a container, a container that is active in an application instance, a portion of a container that is viewable on a user interface of an application instance, etc.), etc. Thus, one or more indication types corresponding to one or more state types of an interaction may be implemented according to the mechanisms described herein.

FIG. 1 is a schematic diagram illustrating an example distributed computing environment 100 for providing dependency-based, or relationship-based, presence indications for co-authored documents that are concurrently accessed by at least two users. Environment 100 includes first application instance 112 displayed on first user interface of first computing device 104A, which corresponds to modified first application instance 138 displayed on first user interface of first computing device 104B; second application instance 106 displayed on second user interface of second computing device 102A, which corresponds to modified second application instance 126 displayed on second user interface of second computing device 102B; network 118; and presence service sub-environment 120, which includes user information database 122 and server computing device 124. Each of the computing devices depicted in example distributed computing environment may communicate with one another via network 118.

In the description below, it is assumed that a first application instance 112 of a co-authored document is opened by a first application user of a first computing device (e.g., first computing device 104A/104B), which is concurrently active with a second application instance 106 associated with the co-authored document opened by a second application user of a second computing device (e.g., second computing device 102A/102B). In the illustrated example, first application instance 112 comprises a first instance of a co-authored spreadsheet application file displayed on first user interface of first computing device 104A. The first application instance 112 includes a pivot table 113A that is accessed by first user Jane Doe 116. In examples, the pivot table 113A may be representative of any underlying active document that includes data that a second active application instance is dependent on, or otherwise related to.

In the first application instance 112, and more specifically in pivot table 113A, Jane Doe 116 has selected cell E14 corresponding to Jane Doe's selection 114A/114B.

Second application instance 106 comprises a second instance of a co-authored spreadsheet application file displayed on second user interface of second computing device 104B. The co-authored spreadsheet application file displayed on second user interface of second computing device 104B is the same application file that is displayed on first user interface of first computing device 104A, and it is accessed concurrently with the first application instance 112 by second user Carlos Otero 108 in second application instance 106. Continuing with this example, second user Carlos Otero 108 has selected cell B1 110A of the co-authored spreadsheet application file displayed on second user interface of second computing device 102A.

One or more server computing devices in presence sub-environment 120, such as server computing device 124, may receive, via network 118, a first indication from first computing device 104A that a first application instance 112 of a co-authored application file is active. Likewise, one or more server computing devices in presence sub-environment 120, such as server computing device 124, may receive, via network 118, a second indication from a second computing device 102A that a second application instance 106 of the co-authored file is concurrently active with the first application instance 112 of the co-authored file.

Upon determining that the first and second application instances 112 and 106 of the co-authored file are concurrently active, server computing device 124 in presence service sub-environment 120 may make determinations, based on credentials that are used to access the first and second application instances 112 and 106, by first user Jane Doe 116 and second user Carlos Otero 108. For example, server computing device 124 in presence service sub-environment 120 may communicate with user information database 122 in order to determine the identity of accessing users. The information database may comprise information associated with a plurality of accounts that are linked to a cloud-based application service, such as presence service sub-environment 120. In some examples, the accounts may be associated with cloud-based document hosting and document co-authoring. Server computing device 124 may determine that credentials associated with first application instance 112 correspond to first application user Jane Doe 116, and that credentials associated with second application instance 106 correspond to second application user Carlos Otero 108.

Upon determining the identity of accessing users of the first application instance 112 and the second application instance 106, presence service sub-environment 120 may cause the identity of the co-active users of those application instances to be displayed on the users' respective computing devices. For example, first user interface of first computing device 104B may be caused to display an image of, a name of, and/or other identifying information of both active users of the active co-authored document (i.e., first user Jane Doe 116 and second user Carlos Otero 108 in active user element 146), and second user interface of second computing device 102B is caused to display an image of, a name of, and/or other identifying information of both active users of the active co-authored document (i.e., first user Jane Doe 116 and second user Carlos Otero 108 in active user element 128).

Presence service sub-environment 120 may further cause an indication of an identity of a user that is accessing an object, cell, or value in a first active application instance, to be displayed in relation to a corresponding user interface component of a second application instance. For example, as Jane Doe's selection 114A/114B corresponds to cell E14 in first application instance 112, that cell may be caused to be outlined or otherwise highlighted and indicated in the display of modified second application instance 126, via presence service sub-environment 120 and network 118, as illustrated by the identification icon 136 in modified second application instance 126, as well as the highlighting of Jane Doe's selection of cell E14 in second related data table 134. Similarly, as Carlos Otero's selection 110A/110B corresponds to cell B1 in second application instance 106, that cell may be caused to be outlined or otherwise highlighted and indicated in the display of modified first application instance 138, via presence service sub-environment 120 and network 118, as illustrated by the identification icon 144 in modified first application instance 138, and the highlighting of that cell 140 in modified first application instance 138.

Computing devices in presence service sub-environment 120 may make further determinations regarding the dependency, or relationship, of one or more objects and/or values in association with each of first application instance 106 and second application instance 112. In the present example, a determination may be made by one or more computing devices in presence service sub-environment 120 that Jane Doe's selection 114A of a cell in pivot table 113A affects one or more objects associated with first dependent, or related, slicer 132, and second dependent, or related, data in table 134. That is, one or more objects in, or associated with, each of slicer 132 and table 134 may be affected by a change that is made by Jane Doe's selection 114A in pivot table 113A/113B. As such, when a determination has been made by one or more computing devices in presence service sub-environment 120 that a dependency, or relationship, of one or more objects in modified second application instance 126 may be affected by Jane Doe's selection 114A, and more specifically a subsequent change to a value in Jane Doe's selection 114A, in pivot table 113A/113B, an indication that the one or more objects in modified second application instance 126 may be affected by Jane Doe's selection 114A is caused to be displayed on the second user interface of second computing device 102B in association with the one or more objects that may be affected by Jane Doe's selection 114A.

In this example, the indication that the one or more objects in modified second application instance 126 may be affected by Jane Doe's selection 114A is caused to be displayed on second user interface of second computing device 102B via a highlighted area, or outlined area comprising the one or more objects—in this case slicer 132 and table 134 that are related to Jane Doe's selection 114A.

Figure 2:
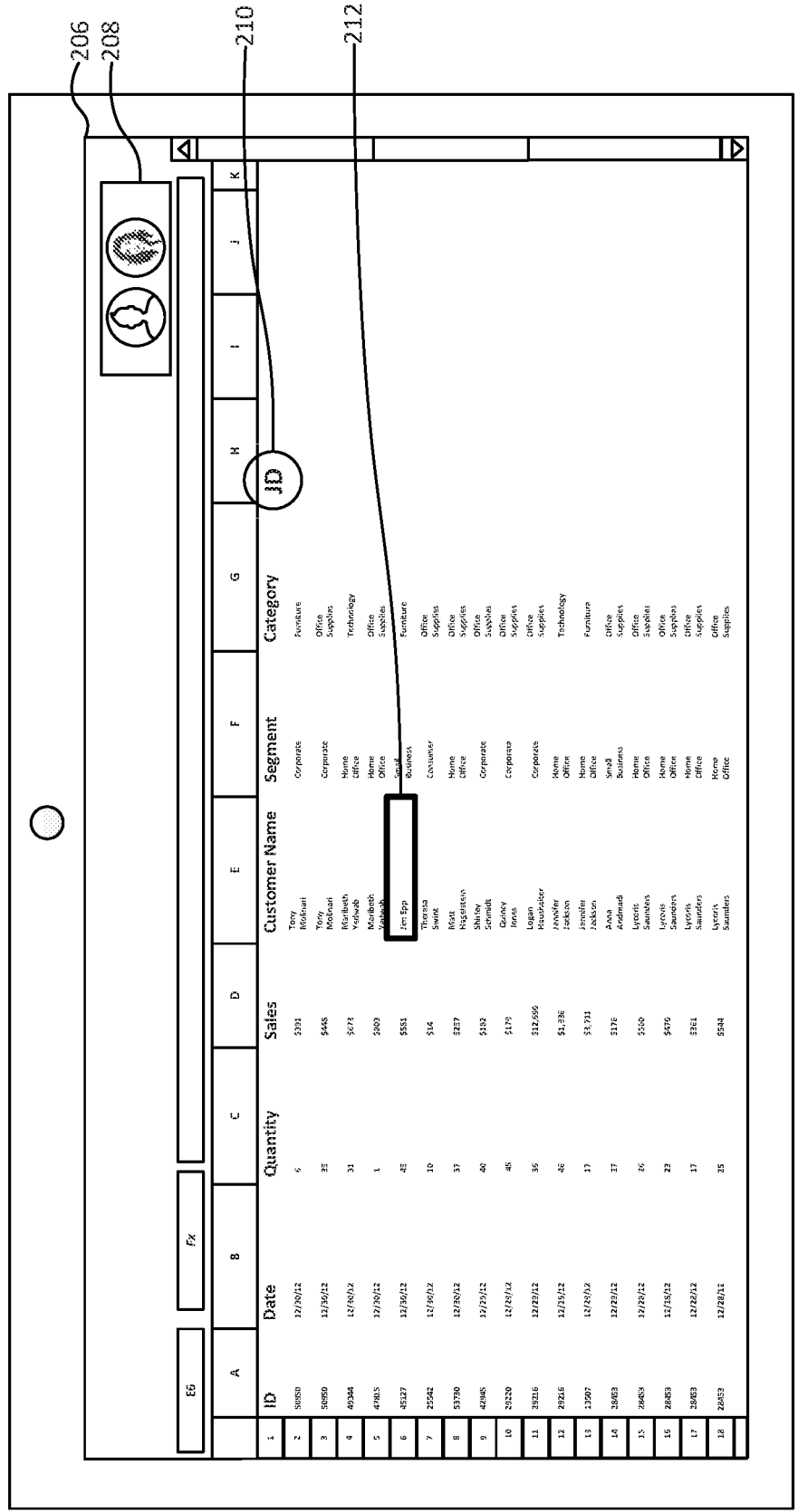
FIG. 2 illustrates an exemplary user interface of a first (source data) sheet of a co-authored document that contains source data for a second (dependent object) sheet of the co-authored document.
Figure 3:
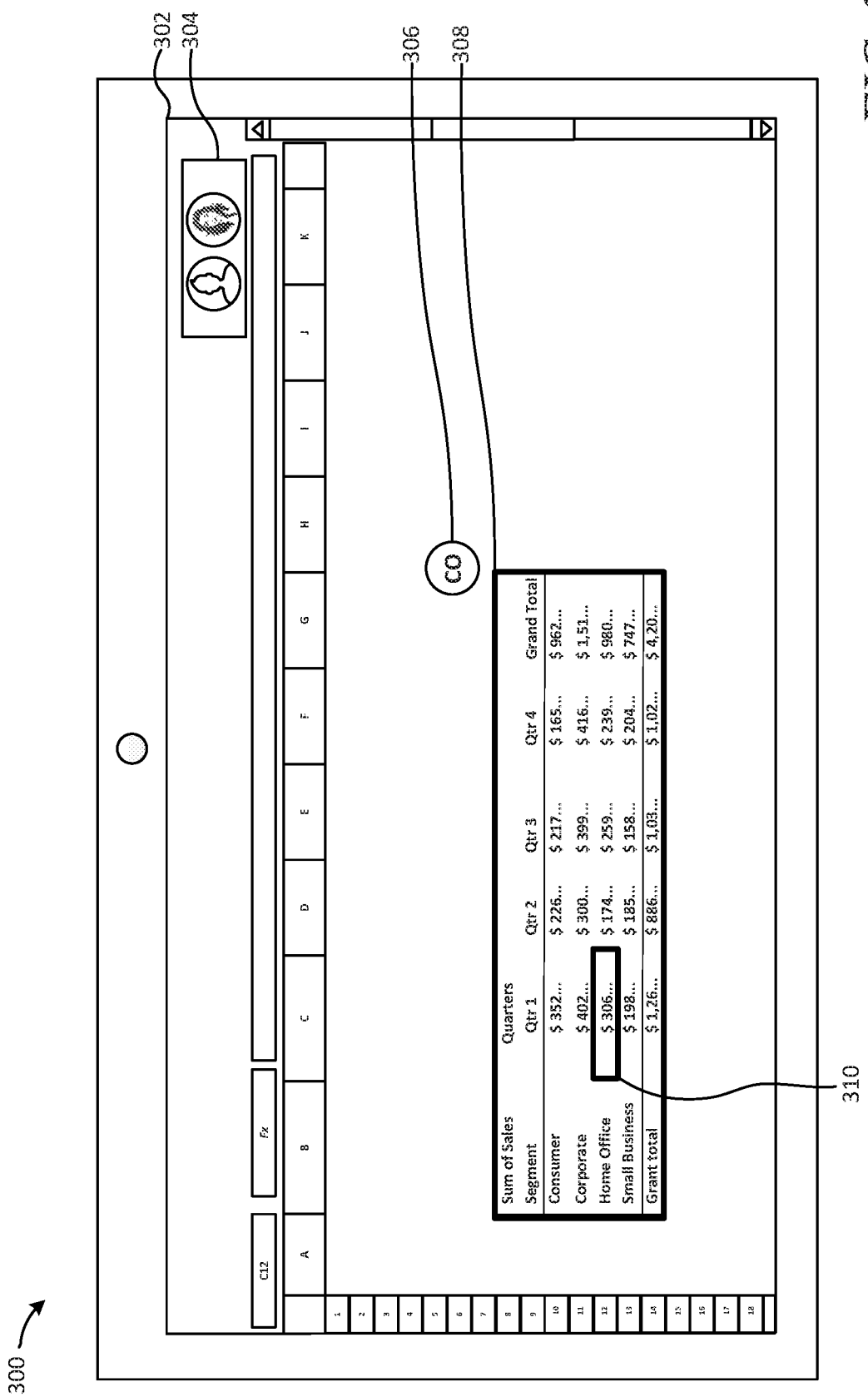
FIG. 3 illustrates an exemplary user interface of a second (dependent object) sheet of a co-authored document that contains objects that are dependent on a first (source data) sheet of the co-authored document.

Although the first and second application instances depicted in distributed computing environment 100 include concurrent active instances of a same sheet, and the same objects, it should be understood that the presence-based co-authoring indication mechanisms described herein may be implemented by a first active application instance that includes first data upon which one or more objects and/or values of a second application instance are dependent on, as more fully described below in relation to FIG. 2 and FIG. 3.

FIG. 2 illustrates an exemplary user interface 200 of a first (source data) sheet 206 of a co-authored document that contains source data for a second (dependent object) sheet (shown in FIG. 3) of the co-authored document. As illustrated, the first (source data) sheet 206 includes source data for a pivot table that is illustrated in relation to FIG. 3. The source data of first (source data) sheet 206 comprises an identifier of clients that have ordered products from an enterprise in column A, a date that the clients have ordered products from the enterprise in column B, a quantity of products that have been ordered from the enterprise in column C, a monetary sales figure corresponding to sales of the products sold by the enterprise in column D, a customer name corresponding to the sales in column E, a segment of the enterprise in column F, and a category corresponding to the sold products in column G.

As described herein it should be understood that, according to the illustrated examples, the first (source data) sheet 206 of FIG. 2 and the second (dependent object) sheet of FIG. 3 are active concurrently and accessed by two different application users. However, according to some examples, one or more indications that one or more objects in a first application instance comprising the first (source data) sheet 206, which may be affected by an interaction with an object in the second (dependent object) sheet of FIG. 3 via a second application instance, may be caused to be persisted and displayed in the first application instance of the first (source data) sheet 206, despite the second application instance in which the interaction occurred no longer being active. Similarly, one or more indications that one or more objects in the second application instance comprising the second (dependent object) sheet of FIG. 3, which may be affected by an interaction with an object in the first (source data) sheet 206 via the first application instance, may be caused to be persisted and displayed in the second application instance of the second (dependent object) sheet of FIG. 3, despite the first application instance in which the interaction occurred no longer being active. Thus, in some examples, a trace indication that an interaction has occurred in a second application instance that affects an object, or application element, in a first application instance, may be caused to be displayed in the first application instance despite the second application instance and the first application instance not being concurrently active (e.g., if the second application instance has been closed).

The currently active accessing user of the first (source data) sheet 206 corresponds to Carlos Otero. Carlos Otero has selected cell E6 212 corresponding to a customer name that may affect one or more objects comprised in the pivot table of the second (dependent object) sheet illustrated in FIG. 3. Both the currently active user of the first (source data) sheet 206, and the currently active user of the second (dependent object) sheet (Jane Doe) are identified in the active user element 208 displayed in the upper right corner of the first (source data) sheet 206.

Additionally, an indication 210 of a currently active user of a second (dependent object) sheet (shown in FIG. 3) corresponding to Jane Doe's active status, and selection of a cell in the pivot table of the second (dependent object) sheet that is related to the underlying source data in the first (source data) sheet 206, in the second (dependent object) sheet is illustrated in exemplary user interface 200. The indication 210 of Jane Doe is shown in relation to objects and/or values of the first (source data) sheet 206 that may affect one or more objects in the second (dependent object) sheet based on dependencies of objects or values in the second (dependent object) sheet on objects and/or values selected by Carlos Otero in the first (source data) sheet. That is, because Carlos Otero has selected cell E6 212 corresponding to a customer name that may affect one or more objects comprised in the pivot table of the second (dependent object) sheet illustrated in FIG. 3, the user identifier for the active user of the second (dependent object) sheet that may have one or more objects that are dependent on the selected cell E6 212 is identified by indication 210 in exemplary user interface 200.

FIG. 3 illustrates an exemplary user interface 300 of a second (dependent object) sheet of a co-authored document that contains objects that are dependent on a first (source data) sheet (depicted in FIG. 2) of the co-authored document. The objects that are dependent on the first (source data) sheet are depicted in the pivot table 308 of the exemplary user interface 300. In this example, the currently active user of the second (dependent object) sheet shown in exemplary user interface 300 is Jane Doe. Jane Doe has selected cell C12 310 of the second (dependent object) sheet. The active user element 302 depicts active users of the current application instance (i.e., the active user of the second [dependent object] sheet active in user interface 300 [i.e., Jane Doe], and the active user that has selected a cell that includes an object or value that one or more objects of the second [dependent object] sheet is dependent on [i.e., Carlos Otero]). Exemplary user interface 300 also depicts an indication 306 that the user Carlos Otero of the first (source data) sheet has selected a cell corresponding to an object or value of the first (source data) sheet that may affect an object or value displayed on exemplary user interface 300. Additionally, the user interface 300 includes an indication of the one or more objects or values displayed by the user interface 300, which may be affected by the user Carlos Otero's selection of a cell in the first (source data) sheet. That indication is illustrated by the bold highlighting of the pivot table 308.

Figure 4:
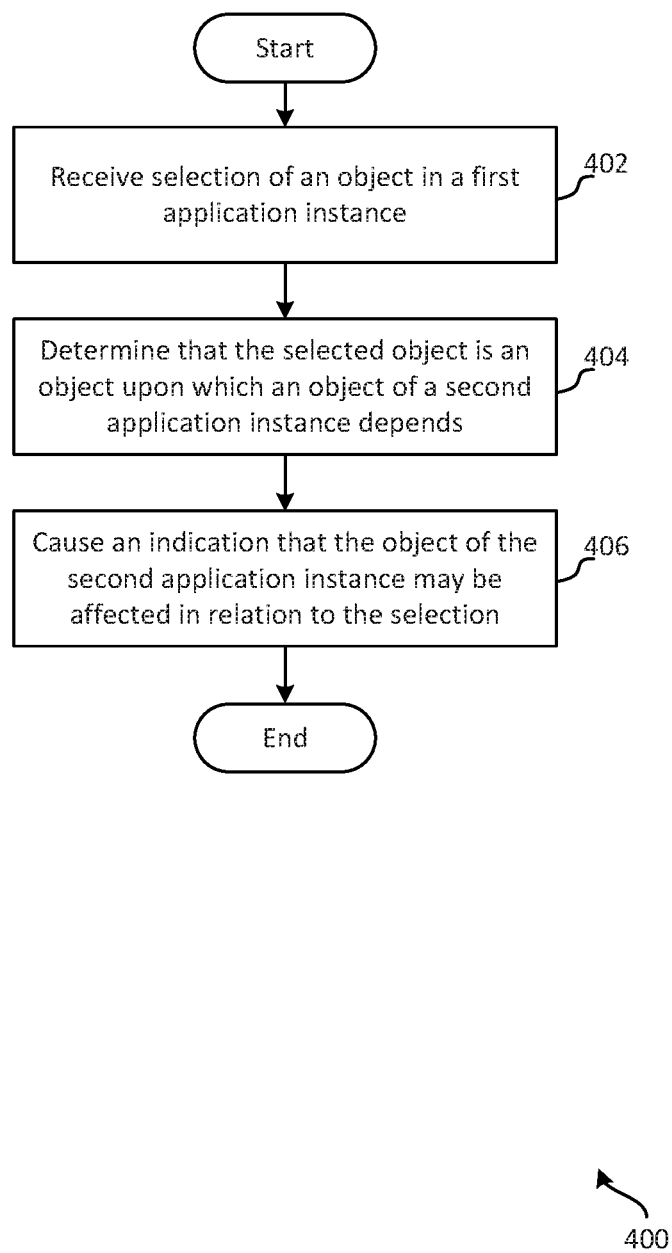
FIG. 4 is a first exemplary method for providing dependency-based presence indications for co-authored documents.

FIG. 4 is a first exemplary method 400 for providing dependency-based presence indications for co-authored documents. The method 400 begins at a start operation and flow continues to operation 402 where a selection of an object in a first active application instance, executed at least in part by a first computing device, is received from the first computing device. In some examples, the first active application instance may comprise the execution of an application file that contains one or more objects from which one or more objects in related cloud-based application files depend. For example, the first application instance may comprise source data for a pivot table that is comprised in a second cloud-based application instance of the file executed by the first active application instance, or a file that is related to the file executed by the first active application instance, via a chain dependency.

From operation 402 flow continues to operation 404 where a determination is made that the selected object is an object upon which an object of a second application depends. In examples, a presence service may receive an indication that the selected object has been selected in the first active application instance, and a determination may be made by the presence service that one or more objects or values in the same file as currently being executed in the first active application instance, or a related file, are currently being viewed and/or displayed by a second application instance, and that the one or more objects are dependent on the selected object from the first application instance.

From operation 404 flow continues to operation 406 where an indication that the dependent object of the second application instance may be affected by a change to the selected object is caused to be displayed on the user interface displaying the second application instance in which an object or value exists that is dependent on the selected object. In some examples, the indication may comprise the outlining of a dependent object or objects in the second application instance. In other examples, the indication may comprise the highlighting of a dependent object or objects in the second application instance. In additional examples the indication may comprise an indication of a user selecting the object from the first application instance, which is displayed in the second application instance.

From operation 406 flow continues to an end operation, and the method 400 ends.

Figure 5:
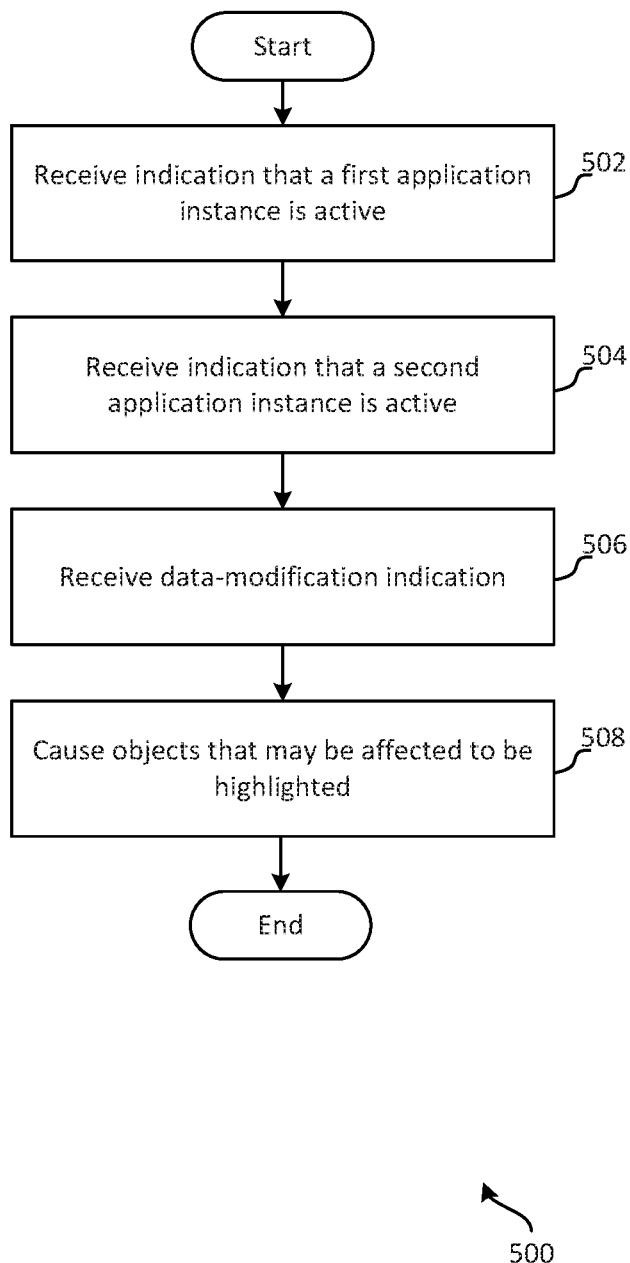
FIG. 5 is a second exemplary method for providing dependency-based presence indications for co-authored documents.

FIG. 5 is a second exemplary method 500 for providing dependency-based presence indications for co-authored documents. The method 500 begins at a start operation and flow continues to operation 502 where an indication is received that a first application instance of a co-authored file is active. The co-authored file may comprise a document comprising one of a: a spreadsheet document, a word processing document, a presentation document, etc. In some examples, an indication may be received via a client computing device that is currently accessing the co-authored file from the client computing device. In other examples, the indication may be received via a client computing device that is currently accessing the co-authored file from an instance of the co-authored file hosted on a server computing device (e.g., cloud-based hosting). In such examples, the hosting may be accomplished via a presence service.

From operation 502 flow continues to operation 504 where an indication is received that a second application instance associated with the co-authored file is concurrently active with the first application instance. In some examples, the second application instance may comprise a concurrent execution of the same co-authored file active in the first application instance. In other examples the second application instance may comprise a concurrent execution of a different co-authored file than the file active in the first application instance. For example, if the second application instance is a different co-authored file, the second application instance may comprise a spreadsheet application file, a word processing file, or a presentation file, that includes one or more objects upon which a file comprising the co-authored file active with the first application instance is dependent upon.

From operation 504 flow continues to operation 506 where a data-modification indication is received. In examples, the data-modification instance may comprise an indication that data affecting at least one object displayed on a user interface of a computing device executing the first application instance is being accessed by a second computing device executing the second application instance. For example, the data-modification indication may comprise a determination (e.g., a determination by a presence service or computing device of a presence service) that one or more displayed or otherwise viewable objects of the first application instance are being interacted with via a second application instance of a file that is the same as, or associated with, the first application instance of the first co-authored file.

From operation 506 flow continues to operation 508 where objects that may be affected by a modification to the data, as indicated by the received data-modification, are caused to be highlighted and/or otherwise indicated in the user interface of a computing device executing the first application instance. In some examples, the highlighting may comprise surrounding one or more affected objects in a border including a bolding and/or outlining in a specific color. In other examples, the highlighting may comprise indicating, via a user identifier in displayed proximity to the one or more affected objects, that the one or more potentially affected objects may be affected by a change to data in a selected cell of an executed instance of the second application instance. Other mechanisms for highlighting the potentially affected objects are contemplated as will be understood by those skilled in the art.

From operation 508 flow continues to an end operation, and the method 500 ends.

Figure 6:
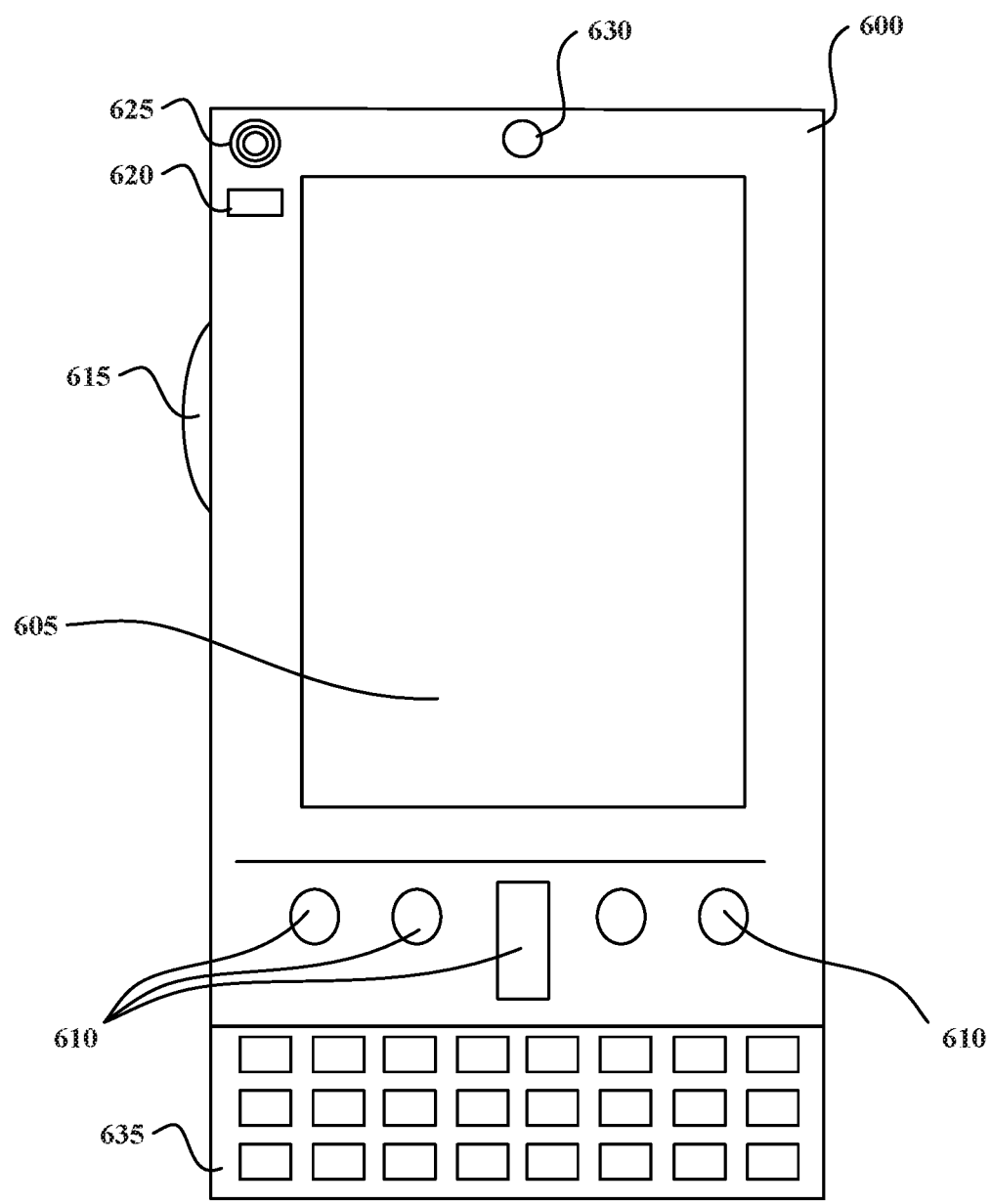
FIGS. 6 and 7 are simplified diagrams of a mobile computing device with which aspects of the disclosure may be practiced.
Figure 7:
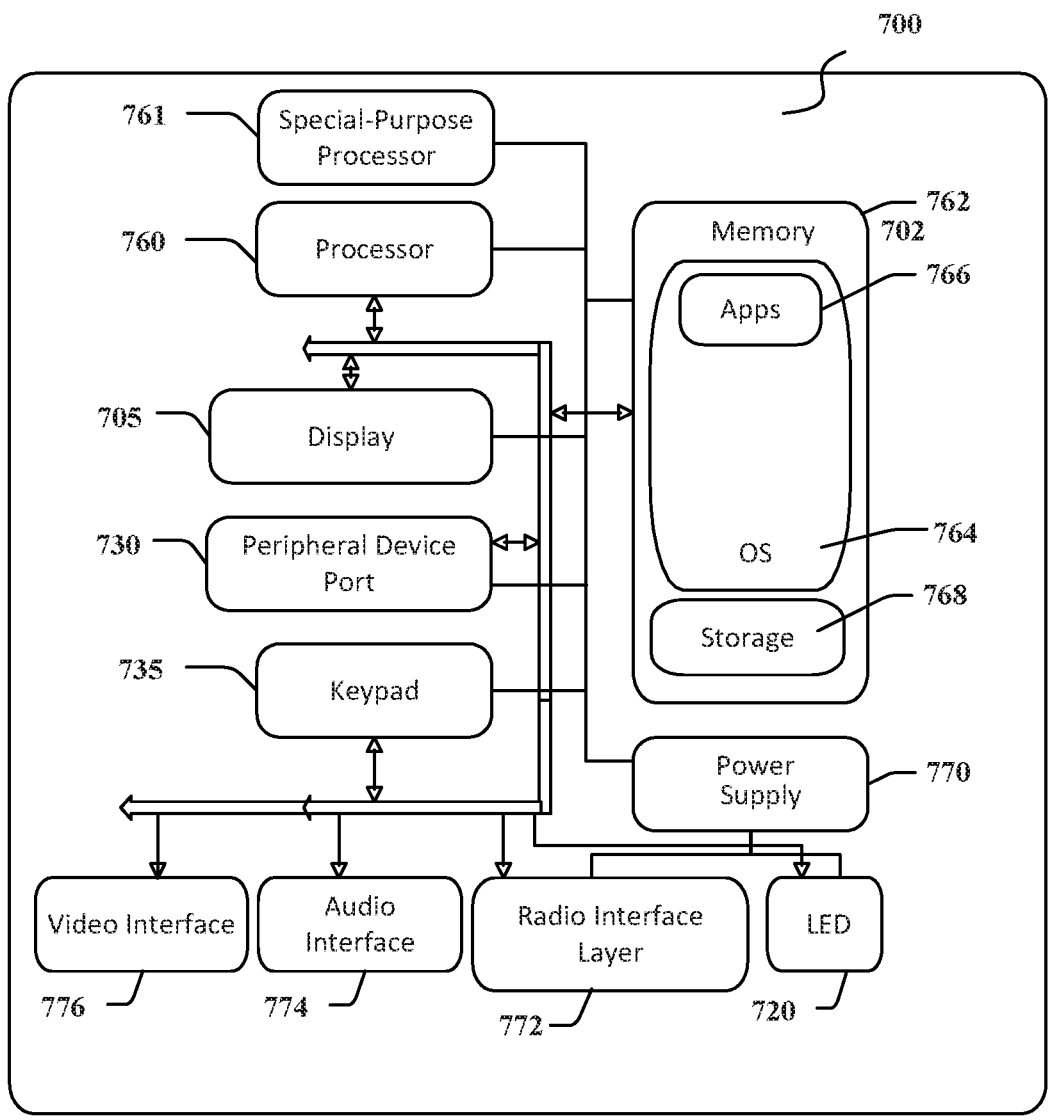

FIGS. 6 and 7 illustrate a mobile computing device 600, for example, a mobile telephone, a smart phone, wearable computer, a tablet computer, an e-reader, a laptop computer, and an augmented reality computer, with which embodiments of the disclosure may be practiced. With reference to FIG. 6, one aspect of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display). If included, an optional side input element 615 allows further user input. The side input element 615 may be a rotary switch, a button, or any other type of manual input element. In alternative aspects, mobile computing device 600 may incorporate more or fewer input elements. For example, the display 605 may not be a touch screen in some embodiments. In yet another alternative embodiment, the mobile computing device 600 is a portable phone system, such as a cellular phone. The mobile computing device 600 may also include an optional keypad 635. Optional keypad 635 may be a physical keypad or a "soft" keypad generated on the touch screen display. In various embodiments, the output elements include the display 605 for showing a graphical user interface (GUI), a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 7 is a block diagram illustrating the architecture of one aspect of a mobile computing device. That is, the mobile computing device 700 can incorporate a system (e.g., an architecture) 702 to implement some aspects. In one embodiment, the system 702 is implemented as a "smart phone" capable of running one or more applications (e.g., browser, e-mail, calendaring, contact managers, messaging clients, games, and media clients/players). In some aspects, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including instructions for identifying a target value in a data set.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world," via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 620 may be used to provide visual notifications, and/or an audio interface 774 may be used for producing audible notifications via the audio transducer 625. In the illustrated embodiment, the visual indicator 620 is a light emitting diode (LED) and the audio transducer 625 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 625, the audio interface 774 may also be coupled to a microphone to receive audible input, such as to facilitate a telephone conversation. In accordance with embodiments of the present disclosure, the microphone may also serve as an audio sensor to facilitate control of notifications, as will be described below. The system 702 may further include a video interface 776 that enables an operation of an on-board camera 630 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/ information transfer and storage means, including electronic mail and collaborative data/information sharing systems.

Figure 8:
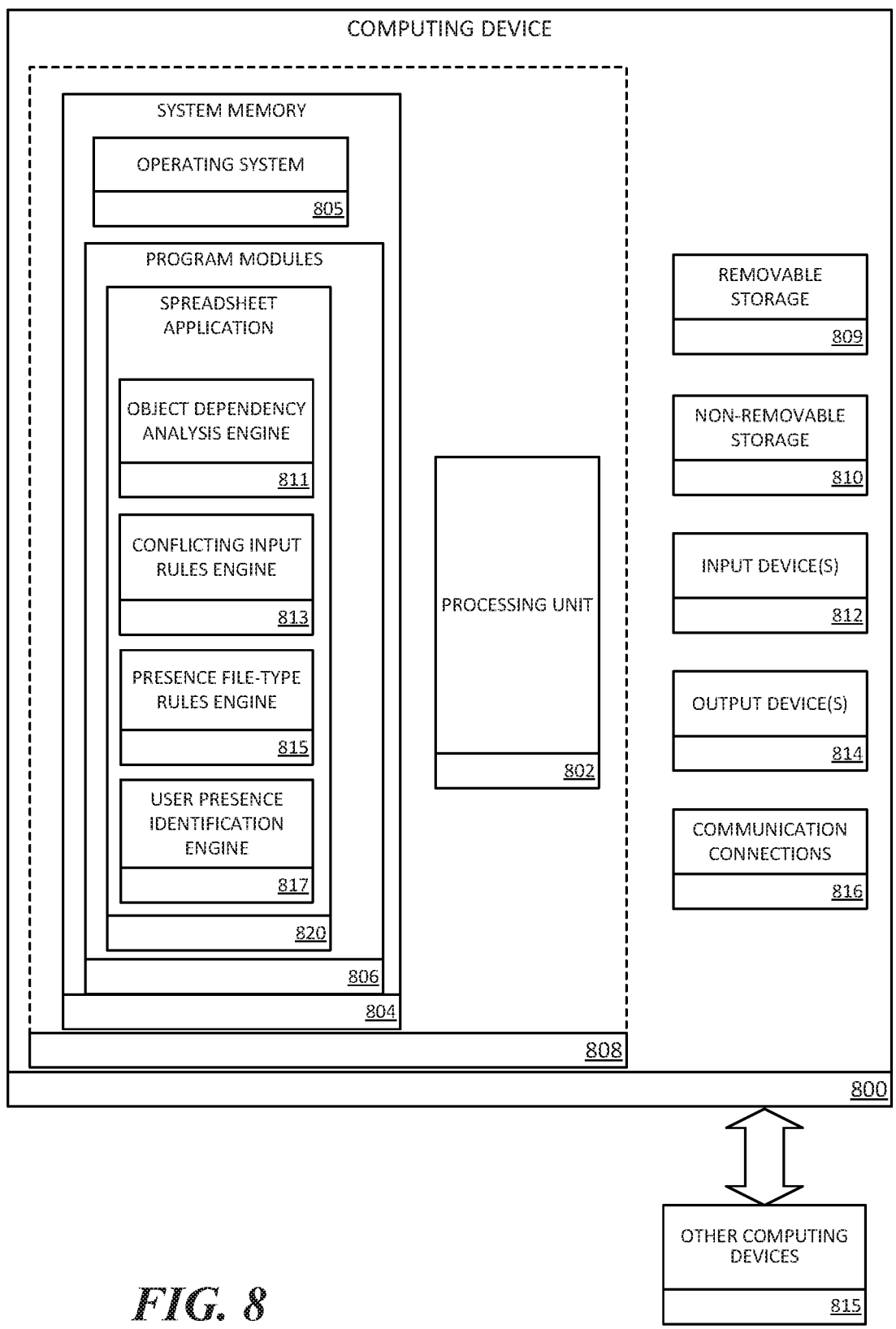
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may have computer executable instructions for assisting with providing dependency-based presence indications for co-authored documents that are concurrently active. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 suitable for running one or more object dependency programs. The operating system 805, for example, may be suitable for controlling the operation of the computing device 800. Furthermore, embodiments of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., spreadsheet application 820) may perform processes including, but not limited to, the aspects, as described herein. According to examples, the object dependency analysis engine 811 may perform one or more operations related to determining whether one or more objects or values associated with a first cell, table, or function selected in first application instance are dependent, and/or otherwise related to, one or more objects or values in a displayed second application instance. The conflicting input rules engine 813 may perform one or more operations related to determining which of one or more rules to apply to a co-authored file or files when a plurality of active application instances input a change to one or more objects or values that are dependent on one another in the co-authored file or files, and only one of the plurality of changes, or a subset of the plurality of changes, can be implemented in order to consolidate the co-authored file or files. The presence file-type rules engine 815 may perform one or more operations related to determining which user interfaces associated with active application instances to display presence information on, what type of presence information to display on those user interfaces, and the area of those user interfaces on which to display presence information in a particular application instance of a co-authored file or files. The user presence identification engine 817 may perform one or more operations related to analyzing the credentials and/or login information associated with active instances for a co-authored file, and presenting on one or more user interface elements associated with that information based on the analysis.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 815. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9:
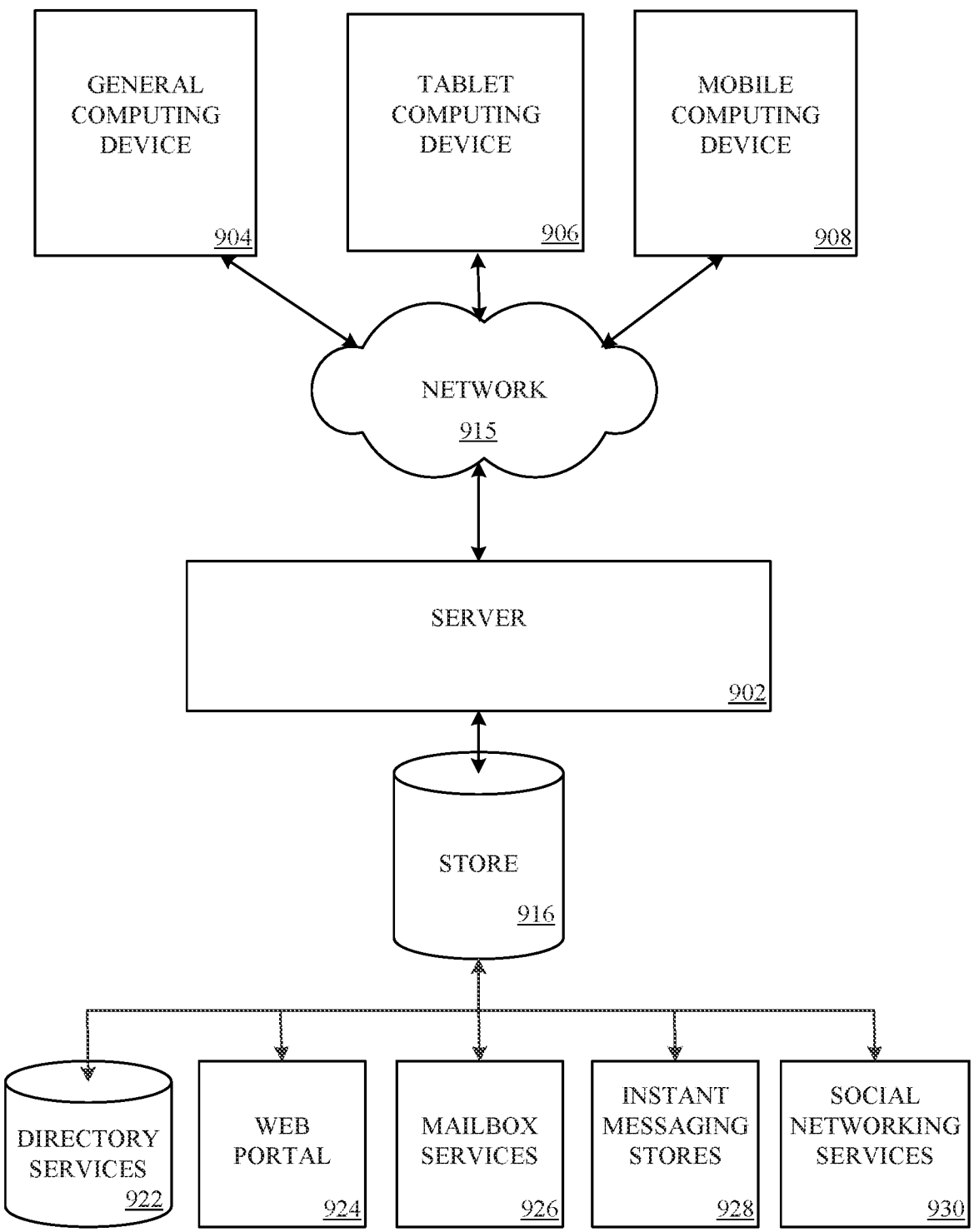
FIG. 9 is a simplified block diagram of a distributed computing system in which aspects of the present disclosure may be practiced.

FIG. 9 illustrates one aspect of the architecture of a system for processing data received at a computing system from a remote source, such as a personal/general computer 904, tablet computing device 906, or mobile computing device 908, as described above. Content displayed at server device 902 may be stored in different communication channels or other storage types. For example, various documents may be stored using a directory service 922, a web portal 924, a mailbox service 926, an instant messaging store 928, or a social networking site 930. The program modules 806 may be employed by a client that communicates with server device 902, and/or the program modules 806 may be employed by server device 902. The server device 902 may provide data to and from a client computing device such as a personal/general computer 904, a tablet computing device 906 and/or a mobile computing device 908 (e.g., a smart phone) through a network 915. By way of example, the computer system described above with respect to FIGS. 6-8 may be embodied in a personal/general computer 904, a tablet computing device 906 and/or a mobile computing device 908 (e.g., a smart phone). Any of these embodiments of the computing devices may obtain content from the store 916, in addition to receiving graphical data useable to be either pre-processed at a graphic-originating system, or post-processed at a receiving computing system.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The systems, methods, and devices described herein provide technical advantages for improving cloud-based co-authoring of document collaboration and editing, for example, by way of providing an indication, in a displayed first active application instance that has an object dependent on a second application instance related to the first application instance. The indication may provide a visual, audio, and/or tactile indicator that changing a selected object or value in the second application instance may affect one or more objects of the first active application instance. The mechanisms described herein also provide for the utilization of indicators to a first active application instance, that a selection of one or more objects or values in an application instance removed down a chain of active application instances (e.g., one or more active application instances of a chain of instances and/or cloud-based documents) may affect one or more objects in the first active application instance.

The current disclosure provides additional technical advantages in that it allows a user of an active application instance in which a selection has been made that may affect an object of another active application instance dependent based on the selection, to determine that an object may be so affected, and the selecting user may be provided with an indication of the identity of the user currently accessing the cloud-based document that may be affected based on the dependency. The disclosed infrastructure thus provides mechanisms for solving issues related to conflicts generated when multiple users that are interacting and editing same or related objects within a spreadsheet. By using social user experience mechanisms and presence identifiers in a user interface, the systems, methods, and devices described herein may be utilized to alert other users that an object the other users are viewing is potentially being modified by another user (or users) interaction with a same or related object, thereby minimizing the likelihood of conflicts and lost data.

As will be understood from the forgoing disclosure one aspect of the technology relate to a method for providing a dependency-based presence indication, the method comprising: receiving an indication that data affecting an object displayed on a user interface of a first active instance of a co-authored file is being accessed by a second active instance of the co-authored file, wherein the data affecting the object is accessed by the second active instance of the co-authored file via an application element that is not currently displayed on the user interface displaying the first active instance; and displaying, on the display of the user interface of the first active instance in relation to the displayed object, an indication that the object may be affected by the second active instance's access of the data affecting the object. In some examples, the indication is received by a first client computing device from which the first active instance of the co-authored file is being accessed, and wherein the second active instance of the co-authored file is accessed by second client computing device. In additional examples, the first active instance of the co-authored file comprises a plurality of document sheets, and wherein the displayed user interface of the first active instance of the co-authored file displays one of the plurality of document sheets. In still other examples the application element that is not currently displayed on the user interface of the first active instance is an object in a document sheet of the plurality of document sheets that is not currently displayed on the user interface displaying the first active instance of the co-authored file. In other examples, the application element that is not currently displayed on the user interface of the first active instance is an object included in a cell displayed on a user interface display of a document sheet that is currently active in the second active instance. In yet other examples, the co-authored file comprises a spreadsheet application file. According to some aspects, the indication is received based on a determination that a value affecting the object displayed on the user interface of the first active instance of the co-authored file has been changed by the second active instance of the co-authored file. In other aspects, the indication that data affecting the object displayed on the user interface of the first active instance is received based on receiving a modification of a value in a cell from the second active instance of the co-authored file that is associated with the object displayed on the user interface of the first active instance of the co-authored file. In still other examples, the association of the value in the cell from the second active instance of the co-authored file with the object displayed on the user interface of the first active instance of the co-authored file comprises a function dependency of the object on the value in the cell.

In another aspect, the technology relates to a system for providing a dependency-based presence indication, the system comprising: a memory for storing executable program code; and one or more processors, functionally coupled to the memory, the one or more processors being responsive to computer-executable instructions contained in the program code and operative to: receive, from a first computing device, a selection of a cell in a first active application instance executed at least in part by the first computing device; determine that the selected cell contains a value upon which an object of a second active application instance executed at least in part by a second computing device depends, wherein the object is displayed on a user interface of the second computing device; and cause, based on the determination, on the user interface of the second computing device in association with the object, an indication that the object may be affected by a changed value in the selected cell to be displayed. In some aspects the first application instance comprises the execution and display of a first sheet of a spreadsheet file, and the second application instance comprises the execution and display of a second sheet of the spreadsheet file. In additional aspects the object of the second application instance comprises a result of a function affected by the value contained in the selected cell. In still other aspects the object of the second application instance is comprised in a pivot table dependent on a value in the selected cell. In additional aspects the one or more processors are further responsive to the computer-executable instructions contained in the program code and operative to: cause an area of the user interface on the second computing device corresponding to a region of the second application instance in which the object may be affected by a changed value in the selected cell to be highlighted. In some examples, the one or more processors are further responsive to the computer-executable instructions contained in the program code and operative to: cause, in association with a region corresponding to the displayed object on the user interface of the second active application instance, an identity of a user that selected the cell via the first application instance to be displayed.

In another aspect, the technology relates to a computer-readable storage device comprising executable instructions that, when executed by one or more processors, assists with providing a dependency-based presence indication, the computer-readable storage device including instructions executable by the one or more processors for: receiving an indication that a first application instance of a co-authored file is active; receiving an indication that a second application instance associated with the co-authored file is concurrently active with the first application instance; receiving a data-modification indication that data affecting at least one object displayed on a user interface of a computing device executing the first application instance is being accessed by a second computing device executing the second application instance; and causing, based on the received data-modification indication, the at least one object to be highlighted on the user interface of the computing device executing the first application instance. In some examples, the instructions are further executable by the one or more processors for: causing, in proximity of the at least one object on the user interface of the computing device executing the first application instance, an indication of a user's identity that accessed the data affecting the at least one object to be displayed. In additional examples, the first application instance of the co-authored file comprises execution of an instance of a co-authored filed comprising a file of a first document type, and wherein the second application instance associated with the co-authored file comprises execution of an instance of a file of a second document type from which the at least one object receives a value that the at least one object is dependent on. In still other examples, the first and second application instances comprise execution and display of a plurality of dependent objects comprised in the co-authored file, and wherein the co-authored file comprises a spreadsheet application file. In additional aspects the first application instance comprises an execution and display of at least one of the dependent objects comprised in a first sheet of the spreadsheet application file, and wherein the second application instance comprises an execution and display of at least one of the dependent objects comprised in a second sheet of the spreadsheet application file.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present disclosure, one skilled in the art may envision variations, modifications, and alternate aspects falling within the spirit of the broader aspects of the general inventive concept embodied in this application that do not depart from the broader scope of the claimed disclosure.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method for providing a dependency-based presence indication, the method comprising:
    causing a first object comprising one of: a table, a function, and a method to be displayed on a first sheet in a first active instance of a co-authored spreadsheet application file, the first object displayed in a first format and with a first value;
    causing a second object comprising data that affects the first object to be displayed in a cell of a second sheet in a second active instance of the co-authored spreadsheet application file, the second object displayed in a second format different from the first format and with a second value;
    receiving an indication that the second object has been selected in the second active instance of the co-authored spreadsheet application file;
    maintaining, after receiving the indication, the display of the first object in the first format and the first value in the first active instance of the co-authored spreadsheet application file;
    maintaining, after receiving the indication, the display of the second object in the second format and the second value in the second active instance of the co-authored spreadsheet application file; and
    causing, based on receiving the indication that the second object has been selected in the second active instance of the co-authored spreadsheet application file, a second indication that the first object may be affected by a further interaction with the second object in the second active instance of the co-authored spreadsheet application file to be displayed on the first active instance in the first sheet corresponding to the displayed first object, wherein the displayed second indication includes an identity of a user account associated with the selection of the second object.

2. The computer-implemented method of claim 1, wherein the indication that the second object has been selected in the second active instance of the co-authored spreadsheet application file is received by a first client computing device from which the first active instance of the co-authored file is being accessed, and wherein the second active instance of the co-authored spreadsheet application file is accessed by a second client computing device.

3. The computer-implemented method of claim 1, wherein the first object is comprised in a pivot table dependent on the second value in the second object.

4. The computer-implemented method of claim 1, wherein the first and second instances comprise execution and display of a plurality of dependent objects comprised in the co-authored spreadsheet application file.

5. The computer-implemented method of claim 1, wherein the displayed second indication further includes highlighting of the displayed first object.

6. The computer-implemented method of claim 1, wherein the displayed second indication further includes display of a translucent color filter over the displayed first object.

7. A system for providing a dependency-based presence indication, the system comprising:
    a memory for storing executable program code; and
    one or more processors, functionally coupled to the memory, the one or more processors being responsive to computer-executable instructions contained in the program code and operative to:
        cause a first object comprising one of: a table, a function, and a method to be displayed on a first sheet in a first active instance of a co-authored spreadsheet application file, the first object displayed in a first format and with a first value;
        cause a second object comprising data that affects the first object to be displayed in a cell of a second sheet in a second active instance of the co-authored spreadsheet application file, the second object displayed in a second format different from the first format and with a second value;
        receive an indication that the second object has been selected in the second active instance of the co-authored spreadsheet application file;
        maintain, after receiving the indication, the display of the first object in the first format and the first value in the first active instance of the co-authored spreadsheet application file;
        maintain, after receiving the indication, the display of the second object in the second format and the second value in the second active instance of the co-authored spreadsheet application file; and
        cause, based on receiving the indication that the second object has been selected in the second active instance of the co-authored spreadsheet application file, a second indication that the first object may be affected by a further interaction with the second object in the second active instance of the co-authored spreadsheet application file to be displayed on the first active instance corresponding to the displayed first object, wherein the displayed second indication includes an identity of a user account associated with the selection of the second object.

8. The system of claim 7, wherein the first object comprises a result of the function affected by the second value contained in the second object.

9. The system of claim 7, wherein the first object is comprised in a pivot table dependent on the second value in the second object.

10. The system of claim 7, wherein the indication that the second object has been selected in the second active instance of the co-authored spreadsheet application file is received by a first computing device from which the first active instance of the co-authored file is being accessed, and wherein the second active instance of the co-authored spreadsheet application file is accessed by a second computing device.

11. The system of claim 7, wherein the first and second instances comprise execution and display of a plurality of dependent objects comprised in the co-authored spreadsheet application file.

12. The system of claim 7, wherein the displayed second indication further includes highlighting of the displayed first object.

13. The system of claim 7, wherein the displayed second indication further includes display of a translucent color filter over the displayed first object.

14. A computer-readable hardware storage device comprising executable instructions that, when executed by one or more processors, assists with providing a dependency-based presence indication, the computer-readable storage device including instructions executable by the one or more processors for:
    causing a first object comprising one of: a table, a function, and a method to be displayed on a first sheet in a first active instance of a co-authored spreadsheet application file, the first object displayed in a first format and with a first value;
    causing a second object comprising data that affects the first object to be displayed in a cell of a second sheet in a second active instance of the co-authored spreadsheet application file, the second object displayed in a second format different from the first format and with a second value;
    receiving an indication that the second object has been selected in the second active instance of the co-authored spreadsheet application file;
    maintaining, after receiving the indication, the display of the first object in the first format and the first value in the first active instance of the co-authored spreadsheet application file;
    maintaining, after receiving the indication, the display of the second object in the second format and the second value in the second active instance of the co-authored spreadsheet application file; and
    causing, based on receiving the indication that the second object has been selected in the second active instance of the co-authored spreadsheet application file, a second indication that the first object may be affected by a further interaction with the second object in the second active instance of the co-authored spreadsheet application file to be displayed on the first active instance in the first sheet corresponding to the displayed first object, wherein the displayed second indication includes an identity of a user account associated with the selection of the second object.

15. The computer-readable hardware storage device of claim 14, wherein the first and second instances comprise execution and display of a plurality of dependent objects comprised in the co-authored spreadsheet application file.

16. The computer-readable hardware storage device of claim 14, wherein the indication that the second object has been selected in the second active instance of the co-authored spreadsheet application file is received by a first client computing device from which the first active instance of the co-authored file is being accessed, and wherein the second active instance of the co-authored spreadsheet application file is accessed by a second client computing device.

17. The computer-readable hardware storage device of claim 14, wherein the first object is comprised in a pivot table dependent on the second value in the second object.

* * * * *